(12) United States Patent
Lahoda

(10) Patent No.: US 7,824,640 B1
(45) Date of Patent: Nov. 2, 2010

(54) TWO STEP DRY $UO_2$ PRODUCTION PROCESS UTILIZING A POSITIVE SEALING VALVE MEANS BETWEEN STEPS

(75) Inventor: Edward J. Lahoda, Pittsburgh, PA (US)

(73) Assignee: Westinghouse Electric Co. LLC, Cranberry Township, PA (US)

( * ) Notice: Subject to any disclaimer, the term of this patent is extended or adjusted under 35 U.S.C. 154(b) by 0 days.

(21) Appl. No.: 12/465,729

(22) Filed: Jul. 20, 2009

Related U.S. Application Data

(63) Continuation-in-part of application No. 11/741,158, filed on Apr. 27, 2007, now abandoned.

(60) Provisional application No. 60/833,232, filed on Jul. 25, 2006.

(51) Int. Cl.
    C01G 43/00          (2006.01)
(52) U.S. Cl. .................. 423/261; 423/253; 423/258; 423/483; 423/19
(58) Field of Classification Search ............. 423/19, 423/253–261, 483
    See application file for complete search history.

(56) References Cited

U.S. PATENT DOCUMENTS

| | | | |
|---|---|---|---|
| 3,168,369 A * | 2/1965 | Stanton et al. ............. 423/260 |
| 3,179,491 A | 4/1965 | Ukaji et al. |
| 3,235,327 A * | 2/1966 | Clarke et al. ............. 423/261 |
| 3,765,844 A | 10/1973 | Rode |
| 3,786,120 A * | 1/1974 | De Hollander et al. ......... 264/5 |
| 3,790,493 A * | 2/1974 | Jeter et al. ................. 252/636 |
| 3,796,672 A * | 3/1974 | Dada et al. ................. 252/636 |
| 3,819,804 A * | 6/1974 | De Hollander ............. 423/261 |
| 3,906,081 A | 9/1975 | Welty |
| 3,970,581 A * | 7/1976 | Jeter et al. ................. 252/636 |
| 4,005,042 A * | 1/1977 | Dada ......................... 252/636 |
| 4,020,146 A | 4/1977 | Knudsen |
| 4,031,029 A * | 6/1977 | Colter et al. ................ 252/636 |
| 4,053,559 A | 10/1977 | Hart et al. |
| 4,090,976 A | 5/1978 | DeHollander et al. |
| 4,112,055 A | 9/1978 | Artaud |
| 4,397,824 A | 8/1983 | Butler et al. |
| 4,808,390 A * | 2/1989 | Tanaka et al. ............. 423/261 |
| 4,830,841 A | 5/1989 | Urza |
| 4,889,663 A | 12/1989 | Michel |
| 5,091,120 A | 2/1992 | Feugier et al. |
| 5,723,100 A * | 3/1998 | Carter et al. .............. 423/261 |
| 5,752,158 A | 5/1998 | Stephenson et al. |
| 5,757,087 A | 5/1998 | Carter et al. |
| 5,875,385 A | 2/1999 | Stephenson et al. |
| 6,136,285 A * | 10/2000 | Feugier ..................... 423/260 |
| 6,656,391 B1 | 12/2003 | Bonnerot et al. |
| 7,374,940 B2 | 5/2008 | Feugier |
| 7,422,626 B2 | 9/2008 | Feugier |

FOREIGN PATENT DOCUMENTS

| | | |
|---|---|---|
| FR | 1323769 | 3/1963 |
| FR | 2060242 | 6/1971 |
| FR | 2512801 | 9/1982 |
| GB | 1341379 | 12/1973 |
| WO | 95/32921 | * 12/1995 |
| WO | 95/33689 | * 12/1995 |
| WO | WO 95/32921 | 12/1995 |
| WO | 01/58810 | * 8/2001 |
| WO | 02/47794 | * 6/2002 |

OTHER PUBLICATIONS

I & Wilton, Bush Wilton valves, http://www.bushandwilton.com/usa/index.htm, 1 page, Apr. 27, 2009.
Bush & Wilton, Rotary Airlocks, Universal Range If "U" Series, http://www.bushandwilton.com/usa/BW_RotaryAirlocks_USA.pdf, 2 pages.
Mott Corporation Brochure, Sintered Metal Filters for Hot and Corrosive Liquid and Gas Applications, 14 pages, Rev. Oct. 2008.
Union Carbide Nuclear Company, T. Shapiro et al., Porous Metal Filters, Application to Feed Materials Production, 24 pages, Jun. 15, 1961.

* cited by examiner

Primary Examiner—Steven Bos

(57) ABSTRACT

The present invention provides a two-step process for producing nuclear grade, active uranium dioxide ($UO_2$) powder in which the first step comprises reacting uranium hexafluoride ($UF_6$) with steam in a flame reactor to yield uranyl fluoride ($UO_2F_2$); and the second step comprises removing fluoride and reducing $UO_2F_2$ to uranium dioxide ($UO_2$) in a kiln under a steam/hydrogen atmosphere. The two-step process, each step separated by a positive sealed valve means to prevent gas, particularly $H_2$ flow back, tightly controls the exothermicity of the reaction, which allows for a very tight temperature control which controls the growth of the particles and results in $UO_2$ powder that is active and of consistent morphology.

15 Claims, 3 Drawing Sheets

TWO STEP DRY UO₂ PRODUCTION PROCESS UTILIZING A POSITIVE SEALING VALVE MEANS BETWEEN STEPS

This present application is a Continuation-in-Part application that claims priority from U.S. Non-Provisional application Ser. No. 11/741,158, filed Apr. 27, 2007, now abandoned which U.S. Nonprovisional application claims priority to U.S. Provisional Application Ser. No. 60/833,232, filed Jul. 25, 2006, all of which is incorporated herein by reference.

BACKGROUND OF THE INVENTION

1. Field of the Invention

The present invention relates to methods of manufacturing uranium oxide powder for use as nuclear fuel and, more particularly, to a two-step dry process for producing uranium oxide powder that eliminates the need for wet processing, and results in easy to handle $UO_2$ powder and stable pellets.

2. Description of the Prior Art

The preparation of commercial nuclear fuels mainly has been by processes which use enriched and depleted uranium (i.e., enriched or depleted in the uranium-235 isotope compared to the uranium-235 content of naturally occurring uranium ore) feed as $UF_6$. The enriched $UF_6$ is converted to $UO_2$ by processes selected to give the ceramic sinterability needed for the preparation of nuclear fuel pellets.

While procedures for converting $UF_6$ to uranium oxides are known, currently available procedures are not particularly efficient or economical for converting $UF_6$ to $UO_2$. More specifically, the $UF_6$ conversions for nuclear fuels have been developed to prepare $UO_2$ with well controlled ceramic properties. Furthermore, because of the need to control their ceramic properties and because of thermodynamic limitations, the known commercial conversion processes are either complex aqueous-based processes with multiple process stages or a one-stage dry process. While the wet processes are easier to control, they produce large amounts of liquid wastes. The single step dry process produces a minimal waste stream but is difficult to operate.

Early patents issued to Reese et al., U.S. Pat. No. 3,168,369, filed in 1961, and to Blundell et al., U.S. Pat. No. 3,235,327, filed in 1962, described all the basic reactions and general technology required to make uranium dioxide nuclear fuel for nuclear reactors from uranium hexafluoride:

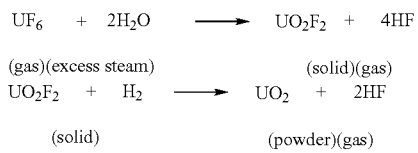

at 1000° F.-1800° F. or 537° C.-982° C. in dry processes. Here an inert gas could be used to promote a gas phase reaction between $UF_6$ and $H_2O$, as steam, to provide a very high surface area, uranyl fluoride ($UO_2F_2$) fluffy powder, having a tap density in the range 0.5 to 1.5 gm./cc. and a surface area in the range of 2 to 4 meters²/gm. (Tap density is obtained by putting the $UO_2$ powder in a graduated cylinder and vibrating for a given time. This sets the volume and the graduated cylinder is weighed to obtain the weight of the powder.)

Numerous U.S. patents have been subsequently issued directed towards processes for the conversion of $UF_6$ to uranium oxides. See, for example, U.S. Pat. No. 4,830,841 and the U.S. patents listed therein, which describe procedures for converting $UF_6$ to uranium dioxide in furnaces, rotary kilns, fluidized beds and the like. For example, U.S. Pat. No. 4,830,841 is directed to a process for preparing $UO_2$ from $UF_6$ by reacting $UF_6$ with steam to produce submicron uranyl fluoride powder, fluidizing a bed of uranium oxide material with a mixture of steam, hydrogen and inert gas at about 580° C. to about 700° C., and introducing the submicron uranyl fluoride powder into the fluidized bed of uranium oxide material so that the uranyl fluoride powder is agglomerated, densified, fluidized, defluorinated and reduced to a fluoride-containing uranium oxide material which is removed from the fluidized bed and then contacted with hydrogen and steam at elevated temperature to obtain $UO_2$ essentially free of fluoride. The $UO_2$ product produced from this process tends to be very inactive and requires an intense milling step to produce moderately active powder. In addition, there often is incomplete conversion of $UO_2F_2$ to $UO_3/U_3O_8$, which leads to unacceptable contamination in the final $UO_2$ powder. This likely is due to inadequate residence time and the growth of large particles in the initial phase which cannot complete the fluoride removal reaction. The differences between plural fluid bed reactors and flame reaction via flame plumes as used in this invention are dramatically, fundamentally different and non-equivalent, as discussed later.

Other U.S. patents disclose single-step processes for producing nuclear reactor fuel, such as U.S. Pat. No. 4,397,824 and U.S. Pat. No. 5,875,385. An exemplary single-step process for producing solid uranium oxide powder is disclosed in U.S. Pat. No. 5,752,158, which describes a single-step MDR (Modified Direct Route—this is really a trade name and not a very illustrative name) process for producing solid uranium oxide powder and gaseous HF from $UF_6$ by bringing together two gaseous reactant streams, one of the streams comprising $UF_6$ optionally admixed with oxygen as $O_2$, and the second reactant stream comprising a mixture of hydrogen as $H_2$ or as a hydrogen-containing compound and oxygen as an oxygen-containing compound. The gaseous reactant streams are brought together at a temperature and composition such that the $UF_6$ is converted rapidly by flame reaction into readily separable solid uranium oxide and a gaseous HF product. Another single-step process is disclosed in U.S. Pat. No. 4,112,005, which describes reacting $UF_6$ with steam within a first region of a vessel in which $UO_2F_2$ is obtained, which then is subjected to reduction within a second region of the vessel to obtain $UO_2$. The $UO_2F_2$ obtained is contacted with a mixture of hydrogen gas and steam in a first zone of the second region of the vessel, in which an oxide having an intermediate composition between $U_3O_8$ and $UO_2$ is contacted with the hydrogen gas and steam within a second zone of the second region of said vessel. The problem with these processes is the low feed rate due to the need to produce acceptable ceramic grade $UO_2$ powder that can be made into dense $UO_2$ pellets.

Additional single-step dry processes for obtaining uranium dioxide powder (i.e., by direct reduction of $UF_6$ into $UO_2$) which include the IDR (Intermediate Dry Route—another trade name, not very descriptive) process have been widely used and are described in, for example, U.S. Pat. No. 4,889,663; U.S. Pat. No. 4,397,824 and French No. 2,060,242. The powders obtained by the dry conversion process, including water vapor hydrolysis followed by pyrohydrolysis of the uranyl fluoride $UO_2F_2$ obtained, have the advantage of being readily sinterable. The powder produced is very active but hard to handle and produces very weak green pellets. Handling therefore is delicate and rejects are numerous if special care is not exercised. The IDR process converts $UF_6$ to $UO_2$ in a one-step, vapor/solid phase reaction that is hard to control and tends to produce a product with a $UO_2F_2$ contaminant. Part of the problem with this process is that two very exothermic processes occur in the same location at the tip of the mixing nozzle: (1) formation of $UO_2F_2$; and (2) some $UO_3$/$U_3O_8$ from the reaction of steam and entrained hydrogen from the surrounding atmosphere. As the process flow rate is increased, the amount of hydrogen that is intermixed with the steam hydrolysis step becomes variable which produces large variations in the flame temperature and results in large variations in the powder properties.

There are several so-called double step processes, to produce $UO_2$ from $UF_6$, utilizing flame reactors and rotary kilns, connected by scroll/screw type rotatable moving means for the first reaction generated $UO_2F_2$ powder. The general problem with these processes is that step 1 production of $UO_2F_2$ is not, in fact, protected from $H_2$ gas intrusion from step 2 formation of $UO_2$ in a rotary kiln; and $H_2$ intrusion into step 1 produces the variations in the powder properties described above. These seem not to be true commercial realizations, as $H_2$ seepage through unfilled screw or scroll feeders leads to the reaction:

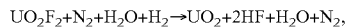
$UO_2F_2+N_2+H_2O+H_2 \rightarrow UO_2+2HF+H_2O+N_2$, with uncontrolled temperature which produces either unreactive or too reactive powder.

Carter et al., U.S. Pat. No. 5,757,087, utilizes at least two obliquely positioned flame reactor plumes, to produce circulating product $UO_2F_2$ product powder, which is "scrolled" to a horizontal kiln for reaction with countercurrent flow of steam and/or $H_2$ to provide $UO_2$ through an outlet chamber. No example is given. Feugier, in U.S. Pat. No. 6,136,285, also utilizes a screw feeder between steps 1 and 2, and teaches concentric introduction of $UF_6$ internally, and $N_2$ in an annular space between $UF_6$ and steam; to provide a reaction at a central nozzle tip injector in a flame reactor to provide $UO_2F_2$ and HF gas. The $N_2$ is injected between the $UF_6$ and the steam to keep crystalline $UO_2F_2$ from forming on the nozzle tip. All HF, excess steam and $N_2$ gas must be exhausted through filters in the top of the flame rector, as they are the only HF off gas filters shown in the patent. While this patent concentrates on the concentric nozzle in the flame reactor, there seems little realization as to what happens to HF formed, and unreacted $H_2$ and steam, in the second stage rotary pyrohydrolysis furnace which injects countercurrent steam and $H_2$. This rotary furnace requires 5 zones, with its FIG. 8 showing kiln temperatures of over 680° C. in zones 1-4, with maximum temperatures of the interior gas of $H_2$ HF and $H_2O$ of 730° C.-800° C., which temperatures should easily translate in a steady state process to the kiln shell. The only HF filters must also exit excess $H_2$ and steam, passing through/bubbling through, under pressure, the screw progressing $UO_2F_2$ and exiting through the same set of filters as the off-gas from the flame reactor exits through. Only one set of filters is contemplated in the patent.

All of these processes provide substantial amounts of HF gas and micro entrained particles of $UO_2$, $UO_2F_2$, and $U_3O_8$, which must be removed in order to make a by-product of HF, uncontaminated with any uranium compounds. One patent in particular, Feugier, U.S. Pat. No. 7,422,626, provides substantial detail in this area. There, again, filters are shown only in the stage 1 flame reactor, which seems to imply that HF and unreacted $H_2$ and steam from the stage 2 rotary kiln pass through the screw transport to exit in the stage 1 flame reactor. Therefore, the flame reactor is not truly hydrogen free and as the flame transitions between laminar and turbulent flow and randomly entrains gases in the flame from the surrounding gas, random fluctuations in temperature occur leading to highly variable $UO_2F_2$ powder properties which leads to highly variable $UO_2$ powder properties.

Here, as in all filter systems, filtering radioactive materials formed as fluffy particles must be cleaned by gas, such as $N_2$ blowback. Feugier, U.S. Pat. No. 7,422,626, requires extremely radical sonic ejection of powder, by $N_2$ blowback at speeds of over 300 m/s for less than 1 sec.; this is over about 700 mph (sonic speed=343.14 m/s at 20° C. which=707.58 mph). This is essential to their process. Sintered metal filters are well know, and almost all such filters have gas blowback valve means, as described in *Mott Corporation Brochure*, "Fiber Metal Gas Filtration" Rev. Feb. 10, 2008, and *Union Carbide* article by T. Shapiro et al. "Porous Metal Filters, Application to Feed Materials Production", Jun. 15, 1961 (copy supplied to the British Library) where application of sintered porous metal filters to solid gas systems was operated in fluid bed systems. There, metal filters that have been plugged with dust, were cleaned by gas blowback at about 115 cubic feet/min., at 15 psi which translates to a velocity of about 417 feet/sec or 127 meters/sec which is below sonic speed. The calculation is as follows:

Nozzle openings=3/16 inch
Number of nozzles=24 (page 15, FIG. 1)
Flow per nozzle=115/24=4.79 cubic feet/minute/nozzle
Velocity=4.79 ft³/(3/16.3/16.3.14/4 in²)*(144 in²/ft²)/(60 sec/min) (where * is equivalent to "times" or x=multiplied by)
Velocity=417 ft/sec or 127 meters/sec.

Ejectors are also shown in FIGS. 1, 4, 6, and 8 of T. Shapiro et al. (the small nubs over the opening of each filter in these figures) and described on page 12, 4th paragraph.

Another process for producing $UO_2$ fuel pellets is disclosed in U.S. Pat. No. 5,091,120, which describes a method for producing fritted $UO_2$ nuclear fuel pellets from metallic uranium. This method uses high value metal and therefore is not economically feasible.

U.S. Pat. No. 6,656,391 discloses the use of a wet ammonium diuranate process (ADU) to produce both $UO_3$/$U_3O_8$ from both uranyl nitrate hexahydrate (UNH) and $UF_6$. In particular, the $UO_3$/$U_3O_8$ that is produced from this process then is processed in a calciner to produce $UO_2$. The ADU process produces a stable but only moderately active (i.e., only achieves a final pellet density of about 97.5% on a consistent basis) $UO_2$ powder. In addition, this process produces a large amount of liquid waste that must be treated to remove the fluoride. The common way of treatment is to add calcium hydroxide ($Ca(OH)_2$) slurry which then forms a large amount of solids from the final neutralization of the fluoride as $CaF_2$. Disposal of these solids is difficult due to their origin in a nuclear facility. The discharged liquid waste while having a very low residual fluoride, is still regulated and must be monitored for any discharge permits that are obtained. Furthermore, the nitrate-based recycle (UNH) must be spiked with HF in order for it to have reasonable handling properties during the centrifugation and drying steps and produces a significant amount of nitrate that must be handled in the discharge as well as fluoride. The nitrate disrupts the ammonia recovery process due to the required addition of sodium hydroxide to free the ammonia from the nitrate. Another problem is the carryover of $NH_4F$ in the dried $UO_3$/$U_3O_8$ product to the final calciner. This fluoride tends to agglomerate the $UO_2$ fines which reduces the overall powder activity and produces a semi-volatile $NH_4F$ material that plates out and plugs the off-gas vents of the calciner.

A further extended type fluid bed process for producing nuclear reactor fuels is disclosed in U.S. Pat. No. 4,053,559

(Hart et al.), which describes a three-step process using continuous, four stage fluidized beds interconnected in series to provide substantially complete conversion of $UF_6$ to $UO_2$. This process, however, is quite complicated, hard to operate and generates a $UO_2$ product with much residual fluoride.

Notwithstanding the extensive prior efforts referred to above, there remains a substantial need for improved procedures for converting $UF_6$ into solid $UO_2$ that produces a highly active, ceramic grade $UO_2$ powder at high production rates and which is easy to control, and which very importantly completely isolates steps where $H_2$ reactant is completely excluded from initial first stage reactions, where it poses serious $UO_2$ product variability problems. Use of fluid bed processes are not an answer due to the issues with forming un-reactive, large solids and residual fluoride removal.

It is, therefore, a major object of the invention to provide a block to $H_2$ backflow into the first reaction stage, a calcination process that can produce $UO_2$ with low residual fluoride levels and a product that has controlled particle sizes and a powder with good reactivity.

It is an object of the present invention to provide a two-step dry process for making nuclear grade, active $UO_2$ powder which tightly controls the exothermicity of the process steps and thus allows for very tight temperature control of each process step, and allows dual HF gas filtering, and particulate recirculation of entrained particles in the off-gases.

It is a further object of the present invention to provide a two-stage process wherein $UF_6$ first is converted to $UO_2F_2$ using steam and then converting the $UO_2F_2$ to $UO_2$ using a mixture of steam and hydrogen, which $UO_2$ contains only very small amounts of unconverted $UO_2F_2$ (less than about 50 ppm).

It is a further object of the present invention to provide a two-stage process for making nuclear grade, stable, active $UO_2$ powder, in which the two-stage process is carried out in two kilns, calciners or in flame reactors in which significant amounts of solids are retained in the kiln or calciner or are entrained in the flame reactor flame.

SUMMARY OF THE INVENTION

The present invention meets this need and solves the above problems by providing a multi-step process for producing nuclear grade, active uranium dioxide ($UO_2$) powder:

(1) by reacting 1 mole of uranium hexafluoride gas ($UF_6$) steam with a steam to $UF_6$ mole ratio of 2 to 10 moles, plus $N_2$ of steam ($H_2O$), plus $N_2$ or other inert gas or gases, in a first stage flame reactor having at least one flame plume, to yield initial product uranyl fluoride particles ($UO_2F_2$) plus less than 0.1 mole of at least one of oxide particles $UO_3$ and $U_3O_8$ HF gas and unreacted steam and $N_2$ or other inert gas or gases, at a temperature in the flame plume of from 300° C. to 800° C.;

(2) passing the HF gas, unreacted steam and $N_2$ or other inert gas or gases, as well as fine, gas entrained initial product particles to a filter where all HF, unreacted steam and $N_2$ or other inert gas or gases pass through the filter and entrained particles do not;

(3) recycling filtered entrained solids by means of a steam or nitrogen powered gas ejector back into the steam or nitrogen flow of the flame reactor;

(4) passing the unentrained initial product, uranyl fluoride particles and any $UO_3$ and $U_3O_8$ particles through a positive, sealed valve means which passes powder, but prevents significant amounts of gaseous feedback from subsequent reactions in the second stage from entering into step (1);

(5) passing the initial product particles that pass through the positive sealed valve means into a second stage rotary kiln reactor, having a kiln shell and a temperature range ramp up and down at its kiln shell of from an initial 400° C. to 700° C. to a final temperature between 100° C. to 300° C., where uranyl fluoride particles with any $UO_3$ and $U_3O_8$ particles, both from step (1), are passed along the rotary kiln countercurrent to 5 moles to 30 moles of steam ($H_2O$), 5 to 50 moles of $H_2$ and inert gas or gases, to reduce uranyl fluoride particles, and remove fluoride as HF gas and to reduce uranyl fluoride particles and any $UO_3$ and $U_3O_8$ particles, to form a sinterable outlet, $UO_2$ powder having a particle size from 0.1 micrometers to 100 micrometer, having a surface area from 2 meters$^2$/gm to 8 meters$^2$/gm (gram), preferably 4.5 meters$^2$/gm to 6 meters$^2$/gm;

(6) passing the HF gas, inert gas or gases, and unreacted $H_2$ or steam from the second stage reactor of step (5) through a filter to remove any entrained solids;

(7) passing the particles that do not pass through the filter of steps (2) and (6) back into the flame reactor of step (1) or the kiln of step (5);

(8) condensing HF and steam gas into liquid HF from the filtered off-gases;

(9) collection of $UO_2$ powder from an outlet of step (5); and

(10) pressing the collected $UO_2$ powder to a density greater than 98.5 wt. %.

A separate powder transport, such as an optional screw feeder or the like can be used between the positive sealed valve used in step (4) and the rotary kiln of step (5). These seals are not completely hermetic, however, they allow substantially less gas to flow back (about 94% to 95% less flowback) than a loose bed of particles, such as in a screw feeder. An optional, second, positive sealed valve can also be used between an optional screw feeder used to pass the initial product in step (5) and the actual rotary kiln of step (5). Residual fluoride as $UO_2F_2$ is less than 50 ppm and combined residual $UO_3$ and $U_3O_8$ is less than 100 ppm total in the final $UO_2$ of step (9). Blowback to clean the HF filters is standard practice and is constituted by short bursts of $N_2$ at below sonic speeds, that is at less than 250 meters/second (m/s). The "active" powder of step (9) is capable of pressing to a density greater than 98.5 wt %. The term "active" as used herein means a $UO_2$ powder that can be readily pressed into a pre-sintered ("green") pellet that can withstand normal handling without chipping and cracking or end-capping and that when sintered produces a high density (>98% theoretical density) pellet without excessive chips or cracks or other flaws.

In the first step of the process, the steam to $UF_6$ mole ratio can range from between about 2 to 10 moles steam per mole $UF_6$, preferably from 4 to 8 moles steam per mole $UF_6$. Varying the steam/$UF_6$ ratio controls the temperature of the reaction which varies the properties of the $UO_2F_2$ powder that is produced as well as the final $UO_2$ powder.

In the second step carried out in a separate kiln, the steam to hydrogen mole ratio can range from between about 1 to 10[?], that is 1 mole steam to 1 mole $H_2$; to 1 mole steam to 10 moles $H_2$. The residence time in the second kiln can range from between about 0.25 to 4.0 hours.

In both steps of the process, the preferred temperature can range from between about 400° C. to 700° C.

BRIEF DESCRIPTION OF THE DRAWINGS

In order to better understand the invention, embodiments of the present invention will now be described, by way of example only, with reference to the following accompanying drawings, in which.

DESCRIPTION OF THE PREFERRED EMBODIMENTS

Figure 1:
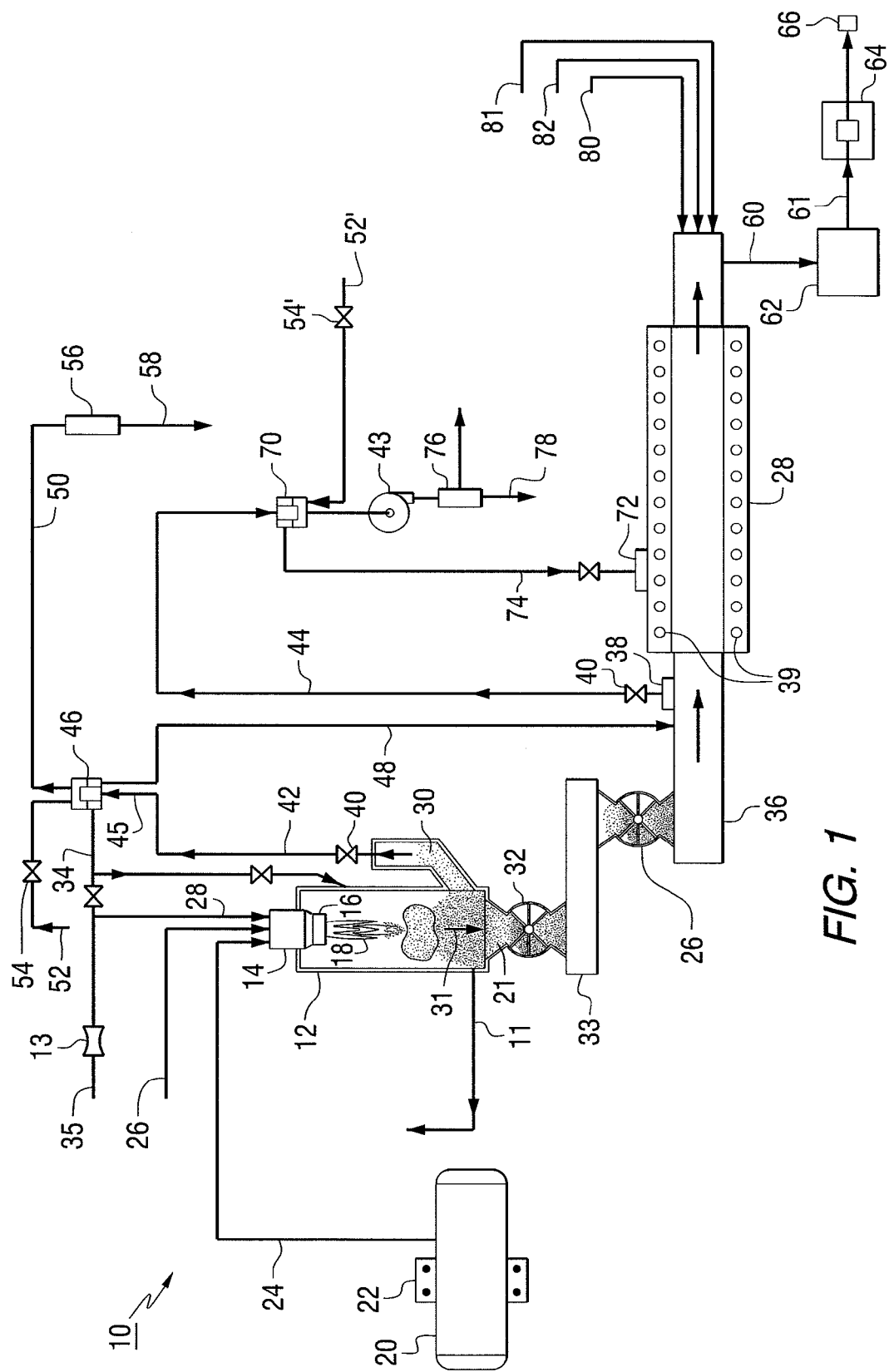
FIG. 1 is a detailed schematic diagram of the method of this invention, showing hermetic gas blocking valve means between the flame reactor and rotary kiln, dual HF and steam gas filters and recirculation of entrained particulates back into the flame reactor.

The present invention provides a two-step process for producing nuclear grade, active uranium dioxide ($UO_2$) powder. The first step of the process comprises reacting uranium hexafluoride ($UF_6$) with steam in a flame reactor to yield uranyl fluoride ($UO_2F_2$) and small amounts of uranium trioxide/uranium octaoxide ($UO_3/U_3O_8$). The second step of the process comprises removing fluoride and reducing $UO_3/U_3O_8$ and/or $UO_2F_2$ to uranium dioxide ($UO_2$) in a rotary kiln, such as, for example, a calciner, under a steam/hydrogen atmosphere.

The term "flame reactor" means a reaction vessel operated to form a flame plume by reacting gas, such as uranium hexafluoride in an hydrolysis reaction with an oxidant such as steam, gaseous $H_2O$ at over about 300° C. to form a powder product and off gas, such as HF and excess steam. Nitrogen gas can be used as a buffer in a co-axial tubular jet or nozzle where usually steam is the outer reactant and uranium hexafluoride is the central reactant, the $N_2$ being used as a buffer gas so that the reaction occurs and solid particles are formed some distance from the jet or nozzle tip, as also described in U.S. Pat. No. 5,757,087 (Carter et al.) and U.S. Pat. No. 6,136,285 (Feugier). The term "rotary kiln" means a rotating tubular pyrohydrolysis oven provided with heater means, powder feed means at an entry end and injector means near the reaction product exit for injecting a countercurrent flow of at least steam, gaseous $H_2O$ and $H_2$ as generally described in U.S. Pat. No. 6,136,285 (Feugier).

Neither the "flame reactor" nor the "rotary kiln" are in any way related to or equivalent to "fluidized bed reactors", which are described, for example in U.S. Pat. No. 4,053,559 (Hart et al.). The process of this invention is meant to specifically exclude fluidized beds, using instead a combination of flame reactor and rotary kiln. Fluidized beds are tanks that inject process gas at the bottom below the powders. At a high enough gas flow and with the proper gas distributor at the bottom, the powder then resembles a liquid in that it conforms to the vessel geometry and solid objects put on the top surface of the fluidized bed would sink if they were dense enough. The advantage of a fluidized bed is that heat transfer is very good throughout the bed and the bed is therefore essentially a single temperature. The disadvantage is that fluidization occurs over a very narrow particle size range for a given gas flow rate. If the particles are too small, they are blown out of the reactor with the off-gas (called elution). If they are too large, they sink to the bottom. In this reaction where particle sizes would range from very small (small amount of $UF_6$ reacts with steam to form a small particle of $UO_2F_2$ to very large ($UF_6$ reacts with steam near an already formed particle of $UO_2F_2$ to make that particle bigger) a fluidized bed would be very difficult to control. Large particles must be milled down to produce a sinterable powder.

The flame reactor concept makes and grows particles while they are entrained in a jet. By controlling the residence time in the jet, one can set the maximum sized particle that is produced. Particles that are finer stay entrained in the gas and are re-introduced to the flame reactor to grow to a larger size.

Figure 2:
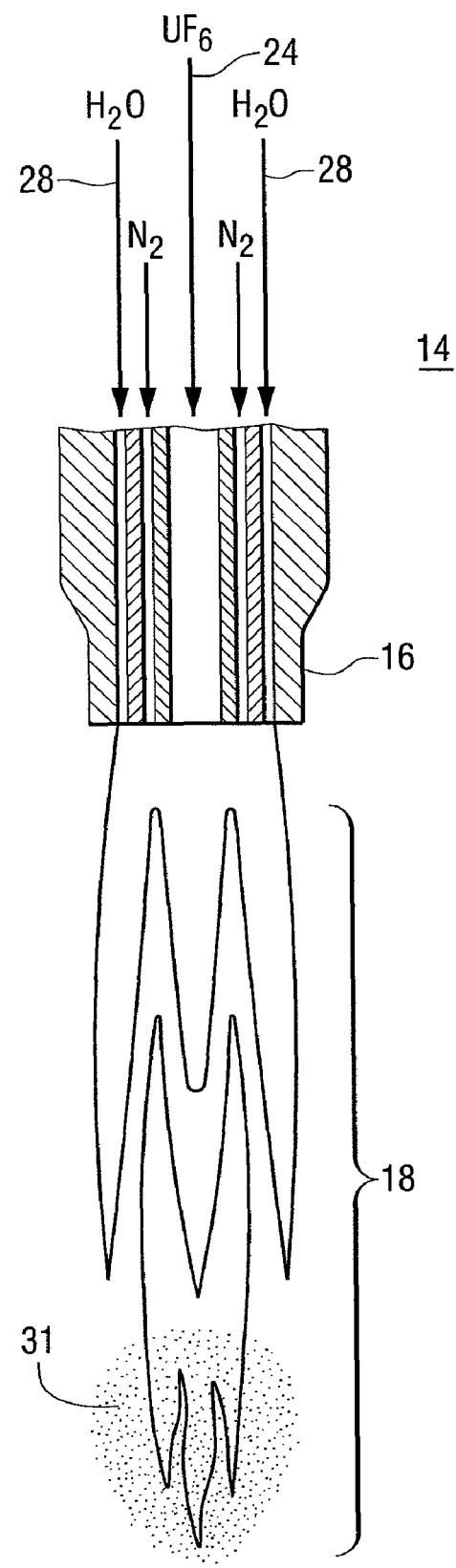
FIG. 2 is a schematic, partially cross sectional view of the flame reactor nozzle and plume.

Referring now to FIG. 1 of the drawings, a multi-step process 10 is provided, where 1 mole of uranium hexafluoride gas ($UF_6$) from a storage cylinder or the like 20 heated to between 65° C. and 175° C. by heater 22, and passed through line 24 to a flame reactor 12, through "flame reactor ejector" 14 having at least one nozzle 16, to react with 2 to 10 moles of steam 28 at a temperature of from 300° C. to 800° C. within at least one flame plume 18 to provide initial product uranyl fluoride ($UO_2F_2$) that do not agglomerate greater than about 0.01 to 40 micrometers, so there is little trapped fluoride which passes as powder particles 31 into hopper 21. The entrained fines will generally have a particle size of from 0.01 micrometer to 20 micrometers. Off gases HF, $N_2$ and $H_2O$ are passed with entrained particles into first gas exit 30 and then as stream 42 to a fines filter 46. Additionally, HF, $N_2$ and $H_2O$ with entrained particles are also withdrawn from the bottom of flame reactor 12 as recycle stream 11 by, for example, the passing recycle stream 11 to dry steam 35 through ejector 13 to pull a vacuum. This stream is then recycled with the dry steam back to the flame ejector reactor nozzle 14. The purpose of this recycle is to grow the very fine particles that are entrained into larger particles that will settle out in the hopper 21 by putting them back into the flame reactor. Inert $N_2$ gas 26 can also be passed into nozzle 16, which nozzle preferably passes parallel gas streams in a concentric gas entry configuration, with a central $UF_6$ stream and outer steam streams with a $N_2$ stream therebetween separating the $UF_6$ and steam at the nozzle so particles are not formed directly at the nozzle entry into the flame reactor 12. This is better shown in FIG. 2 of the drawings, where a flame plume 18 is shown. Preferably, in the first step of the process, the steam: $UF_6$ mole ratio can range from between about 4 to 8 mole steam: 1 mole $UF_6$.

Figure 3:
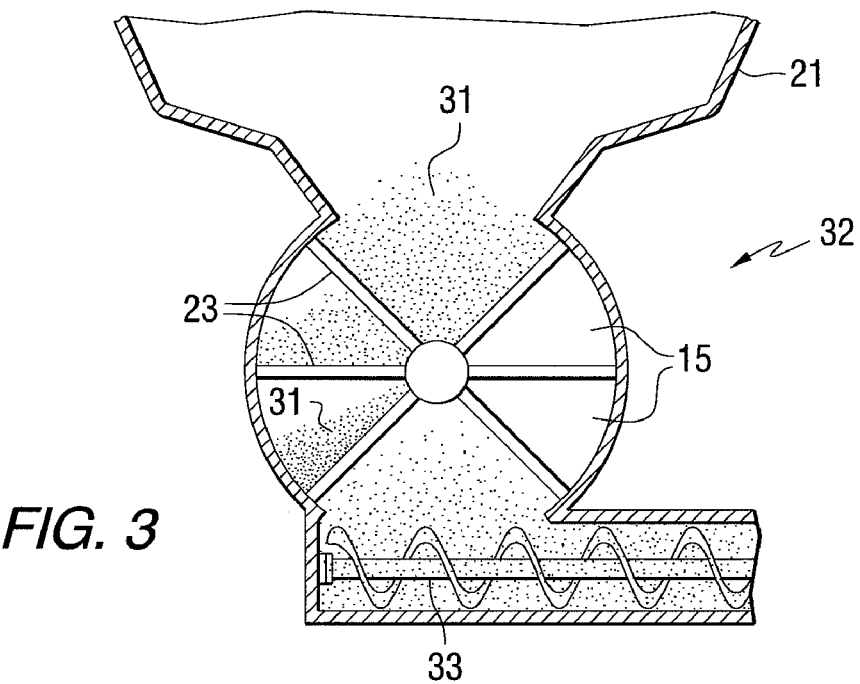
FIG. 3 is a schematic view of the hermetic gas blocking valve means in the form of a star valve, shown feeding to a screw feed transport means.

Very importantly, to provide truly multi-step process, with no flow-back of gas that could contain hydrogen from subsequent steps, a "positive sealed valve means" 32 is required between the hopper 21 and any further steps, such as optional screw feeder 33. This is preferably in the form of a rotary vane star airlock valve, shown in FIGS. 1 and 3. The star valve rotates, which controls the flow of powder through the valve and prevents any significant amount of the gases from moving from the lower area to the upper area (or visa versa). By "significant amount" is meant less than 0.1 vol. % of gases used in the rotary kiln. The advantage of this type of valve over a screw feeder is that a positive seal is always provided whereas in a screw feeder, if the powder level gets too low, there is a direct path for gases to flow from the high to low pressure area or if the gas pressure in the second reactor is too high, the gas can blow through the powder back into the low pressure area. As shown in FIG. 3, powder particles 31 from the hopper 21 initially fill spaces between the vanes 23, which vanes turn to empty the particles into a subsequent apparatus, such as optional screw feeder 33. The vanes minimize potential backflow of gases harmful to step 1, such as $H_2$ utilizing tight vane contact with the walls of the valve and gas lock spaces 15 references. Some gas can get into the volume between the vanes of the star valve, but this is minor. Another positive sealed approach would be the use of lock hoppers. The term "positive sealed valve means" means any device which minimizes gas backflow into the flame reactor.

Recycle line 34 takes particles from the fines filter 46 back to the flame reactor. The initial process $UO_2F_2$ powder as well as the minor amount of $UO_3$ and $U_3O_8$ powder are transported by gravity, fall, or as shown in FIGS. 1 and 3 optional screw feeder 33, scroll member or sealed conveyor belt, or the like to a rotary kiln/calciner 36 having a containing kiln shell 28' with heaters 39 surrounding the kiln. The kiln operates at a shell temperature of 400° C. at the $UO_2F$ feed end, to a maximum middle temperature of 700° C. and at a temperature of 100° C. to 300° C. at the $UO_2$ product discharge end. The bed temperature is likely to be higher than the shell temperature due to the exothermic nature of the $UO_2F_2+H_2 \Rightarrow UO_2+2HF$ reaction. However, at steady state, the bed temperature will be in equilibrium with the wall temperature wall temperatures. Use of temperatures over 700° C. will pre-sinter the powder and reduce the activity of the final product unless extreme particle size reduction is enforced upon the particles. A second optional positive seal valve 26 can be used at the exit of the screw feeder if desired, before entry into the rotary kiln.

At the $UO_2$ solid exit end of the rotary kiln a parallel countercurrent flow of 5 moles to 30 moles of dry steam 80 and 5 moles to 50 moles $H_2$, 81 plus inert $N_2$, 82 carrier gas, per 1 mole $UO_2F_2$ powder is injected to remove fluoride as HF gas to reduce $UO_2F_2$ and $UO_3$ and $U_3O_8$ to compressible $UO_2$ powder having a particle size from 0.1 micrometers to 100 micrometers having a surface area from 2 meters$^2$/gm to 7 meters$^2$/gm, containing less than about 50 ppm $UO_2F_2$ residue and that can be pressed to a final sintered density greater than 98.5 wt. % of theoretical density.

The generated HF and unreacted $H_2$ and steam plus $N_2$ gases are exited preferably at the initial front end through second off-gas exit 38, feeding into second off-gas stream 44, and passing to separate fines filter 70. This second HF, steam, nitrogen and $H_2$ off-gas exit 38 within the calciner is essential to the process as a means of maintaining a steady state pressure in the calciner. Also shown is a fines recirculation line 74 into fines kiln entry 72 back into the rotary kiln/calciner. A condenser 76 is also shown with a line pump 43 to remove HF as a liquid 78 and produce a fluoride free $H_2$ which can then be burned or recycled.

As shown in FIG. 1, as the off gases and entrained particles from stream 42 and 45 pass into fines filter 46, HF and steam and nitrogen passes to stream 50 and into condenser 56 to provide clean HF liquid 58 for storage or sale. The nitrogen is discharged to the atmosphere. Additionally, trapped particulates are recirculated via recycle line 48 to the rotary kiln as the filter is cleaned via standard subsonic pulse valve 54 admitting $N_2$ gas from pulse line 52 in a standard fashion well known in the art.

Figure 4:
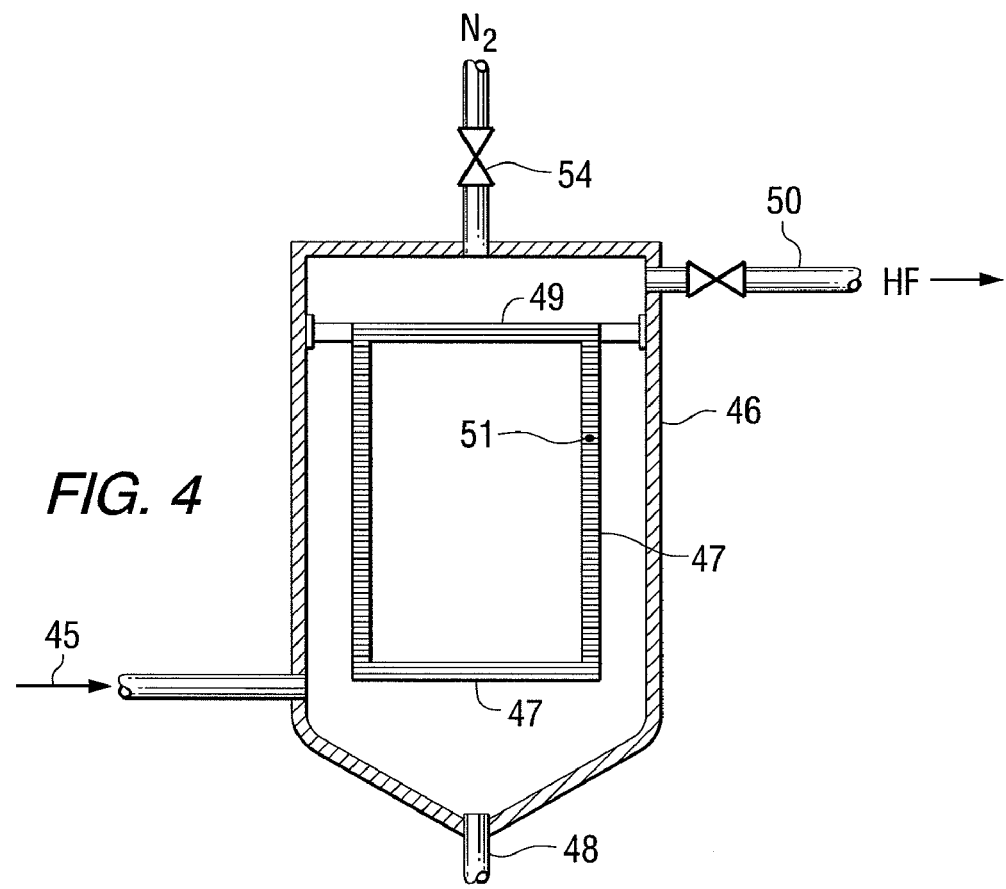
FIG. 4 is a schematic, partly in section of one embodiment of a type of gas filter with particulate feedback and regular pulse valve inert gas blowback cleaning mechanism.

FIG. 4 shows a standard type fines filter shown as 46 or 70 in FIG. 1, with off-gas inlet stream 45, HF, steam and $N_2$ and other off gas outlet stream 50, fines return recycle line 48 and pores 51 in the filter body 47. The gas passes through top filter portion 49 while particles collect generally on the filter body which utilizes a $N_2$ subsonic blow-back valve 54 for cleaning the filter. Fines filter 70 shows $N_2$ feed pulse gas line 52' and pulse valve 54'.

Referring back to FIG. 1, a plurality of valves 40 are also shown as well as $UO_2$ stream exit 60 into powder container 62 which can pass to pellet press 64 through line 61 to provide $UO_2$ pellets 66.

EXAMPLE

The following example is intended to illustrate the invention and should not be construed as limiting the invention in any way.

Example

In the first reaction, the steam/$UF_6$ ratio of 0.2 by weight with the temperature in the flame reactor of 400° C.

In the rotary kiln reaction, the steam/$H_2$ ration=20 by weight, with the temperature held at a maximum 600° C. The steam/$UO_2$ ratio is about 0.8 by weight The $UO_2$ powder surface area is equal to approximately 4 meters$^2$/gm. The final density of pressed and sintered pellets was approximately 98.5%.

A positive valve seal—star valve is used between the first reaction and the rotary kiln.

While specific embodiments have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A multi-step process for producing nuclear grade, active uranium dioxide ($UO_2$) powder by:
    (1) reacting 1 mole of uranium hexafluoride gas ($UF_6$) with 2 to 10 moles of steam, plus inert gas, in a first stage flame reactor having at least one flame, to yield initial product uranyl fluoride particles ($UO_2F_2$), HF gas and unreacted steam and inert gas, at a temperature of from 300° C. to 800° C.;
    (2) passing HF gas, unreacted steam and inert gas, as well as gas entrained initial product particles to a filter, where all HF, unreacted steam and inert gas pass through the filter and entrained particles do not;
    (3) passing the unentrained initial product uranyl fluoride particles through a positive valve means which passes powder, but prevents significant amounts of gaseous feedback from subsequent reactions into step (1);
    (4) passing the initial product particles that pass through the positive sealed valve means into a second stage rotary kiln reactor, having a kiln shell and a temperature range at its kiln shell of from an initial 400° C. to 700° C. to a final temperature between 100° C. to 300° C., where uranyl fluoride particles are passed along the rotary kiln countercurrent to steam, hydrogen, and inert gas, to react and remove fluoride as HF gas and to reduce uranyl fluoride particles, to form a sinterable, outlet, $UO_2$ powder;
    (5) passing the HF gas, steam, inert gas, and unreacted $H_2$ or steam and any entrained particles to a filter where all HF, steam, inert gas, and $H_2$ gases pass through the filter and entrained particles do not;
    (6) passing the particles that do not pass through the filters of steps (2) and (5) back into the flame reactor of step (1) or the kiln of step (4);
    (7) condensing HF and steam gas into liquid HF from the filtered off-gases; and
    (8) collecting $UO_2$ powder from an outlet of step (4).

2. The method of claim 1, wherein step (1), generates less than 0.1 mole of at least one of oxide particles $UO_3$ and $U_3O_8$ which are also formed and pass through the method.

3. The method of claim 1, wherein the inert gas is $N_2$.

4. The method of claim 1, wherein the filtered entrained particles filtered in step (2) are recycled by means of a gas selected from the group consisting of inert gas or gases and steam and mixtures thereof back into the flame reactor of step (1).

5. The method of claim 4, wherein the gas is selected from the group consisting of $N_2$ and steam and mixtures thereof and an ejector is used in the recycle stream.

6. The method of claim 1, wherein, in step 4, the inert gas is $N_2$ and the sinterable $UO_2$ powder formed has a particle size of from 0.1 micrometer to 100 micrometers.

7. The method of claim 1, wherein entrained particles in steps (2) and (5) have particle sizes from 0.001 micrometer to 0.1 micrometer and the inert gas used in step (5) is $N_2$.

8. The method of claim 1, wherein the initial product that passes through the positive sealed valve means of step (3) is passed into the rotary kiln of step (5) by use of a screw feeder.

9. The method of claim 8, wherein a positive valve means is used between the screw feeder and the rotary kiln.

10. The method of claim 1, wherein the positive valve means is a rotary vane airlock valve.

11. The method of claim 9, wherein the positive valve means is a rotary vane airlock valve.

12. The method of claim 1, wherein the $UO_2$ powder of step (8) has residual $UO_2F_2$ of less than 50 ppm and has a combined residual $UO_3$ and $U_3O_8$ of less than 100 ppm.

13. The method of claim 1, wherein the filters are cleaned by inert gas blowback bursts with a through the nozzle velocity of less than 250 m/s.

14. The method of claim 1, wherein the collected $UO_2$ powder of step (8) is pressed to a density greater than 98.5 wt. %.

15. The method of claim 1, wherein the outlet $UO_2$ powder has a surface area from 2 meters$^2$/gm to 8 meters$^2$/gm.

* * * * *